United States Patent
Henderson et al.

(10) Patent No.: US 8,878,923 B2
(45) Date of Patent: *Nov. 4, 2014

(54) SYSTEM AND METHOD FOR ENHANCED PREDICTIVE AUTOFOCUSING

(75) Inventors: David LaVan Henderson, Clifton Park, NY (US); Kevin Bernard Kenny, Niskayuna, NY (US); Siavash Yazdanfar, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 1037 days.

This patent is subject to a terminal disclaimer.

(21) Appl. No.: 12/422,363

(22) Filed: Apr. 13, 2009

(65) Prior Publication Data

US 2009/0195688 A1    Aug. 6, 2009

Related U.S. Application Data

(63) Continuation-in-part of application No. 11/843,754, filed on Aug. 23, 2007, now Pat. No. 8,179,432.

(51) Int. Cl.
*H04N 5/225* (2006.01)

(52) U.S. Cl.
USPC ............. 348/79; 348/345; 348/340; 348/349; 348/350; 348/351; 382/254; 382/260; 382/172; 382/192; 382/199; 382/261; 382/194; 382/278

(58) Field of Classification Search
USPC ........ 348/79, 345, E5.042, E5.024, 340, 344, 348/350, 349
See application file for complete search history.

(56) References Cited

U.S. PATENT DOCUMENTS

| | | | |
|---|---|---|---|
| 5,790,710 A | 8/1998 | Price et al. | |
| 5,912,699 A | 6/1999 | Hayenga et al. | |
| 6,173,083 B1* | 1/2001 | Avinash | 382/260 |
| 6,208,763 B1* | 3/2001 | Avinash | 382/254 |
| 6,344,930 B1* | 2/2002 | Kaneko et al. | 359/666 |
| 6,518,554 B1 | 2/2003 | Zhang | |
| 6,711,283 B1 | 3/2004 | Soenksen | |
| 6,816,606 B2 | 11/2004 | Wetzel et al. | |
| 6,917,696 B2 | 7/2005 | Soenksen | |
| 7,034,883 B1* | 4/2006 | Rosenqvist | 348/345 |

(Continued)

FOREIGN PATENT DOCUMENTS

| | | |
|---|---|---|
| JP | 11231228 A | 8/1999 |
| JP | 2001091846 A | 4/2001 |
| JP | 2004145195 A | 5/2004 |

OTHER PUBLICATIONS

Kenny et al., "System and Method for Imaging With Enhanced Depth of Field", U.S. Appl. No. 12/579,995, filed Oct. 15, 2009.

(Continued)

*Primary Examiner* — Jude Jean Gilles

(57) ABSTRACT

In an imaging device having an objective and a stage for holding a sample to be imaged, a method for autofocusing is presented. The method includes determining a measured focus value corresponding to at least a first of a plurality of logical image segments. Further, the method includes imaging the first logical image segment using the measured focus value. The method also includes determining a predicted focus value for a second of the plurality of logical image segments using the measured focus value and a stored focus variation parameter. In addition, the method includes imaging the second logical image segment using the predicted focus value.

21 Claims, 10 Drawing Sheets

(56) References Cited

U.S. PATENT DOCUMENTS

| | | |
|---|---|---|
| 7,155,049 B2 | 12/2006 | Wetzel et al. |
| 7,167,305 B2 | 1/2007 | Ogihara |
| 7,576,307 B2 * | 8/2009 | Yazdanfar et al. ......... 250/201.3 |
| 7,835,637 B2 * | 11/2010 | Li et al. ......................... 396/125 |
| 8,179,432 B2 | 5/2012 | Yazdanfar et al. |
| 8,314,837 B2 | 11/2012 | Kenny et al. |
| 2003/0210406 A1 * | 11/2003 | Hardy ............................ 356/603 |
| 2004/0256538 A1 | 12/2004 | Olson et al. |
| 2005/0089208 A1 | 4/2005 | Dong et al. |
| 2006/0007345 A1 | 1/2006 | Olson et al. |
| 2007/0069106 A1 | 3/2007 | Krief et al. |
| 2008/0069553 A1 * | 3/2008 | Li et al. ......................... 396/125 |

OTHER PUBLICATIONS

Kenny et al., "System and Method for Imaging With Enhanced Depth of Field", U.S. Appl. No. 12/580,009, filed Oct. 15, 2009.

Unofficial English translation of Office Action issued in connection with corresponding JP Application No. 2012-504658 on Nov. 26, 2013.

* cited by examiner

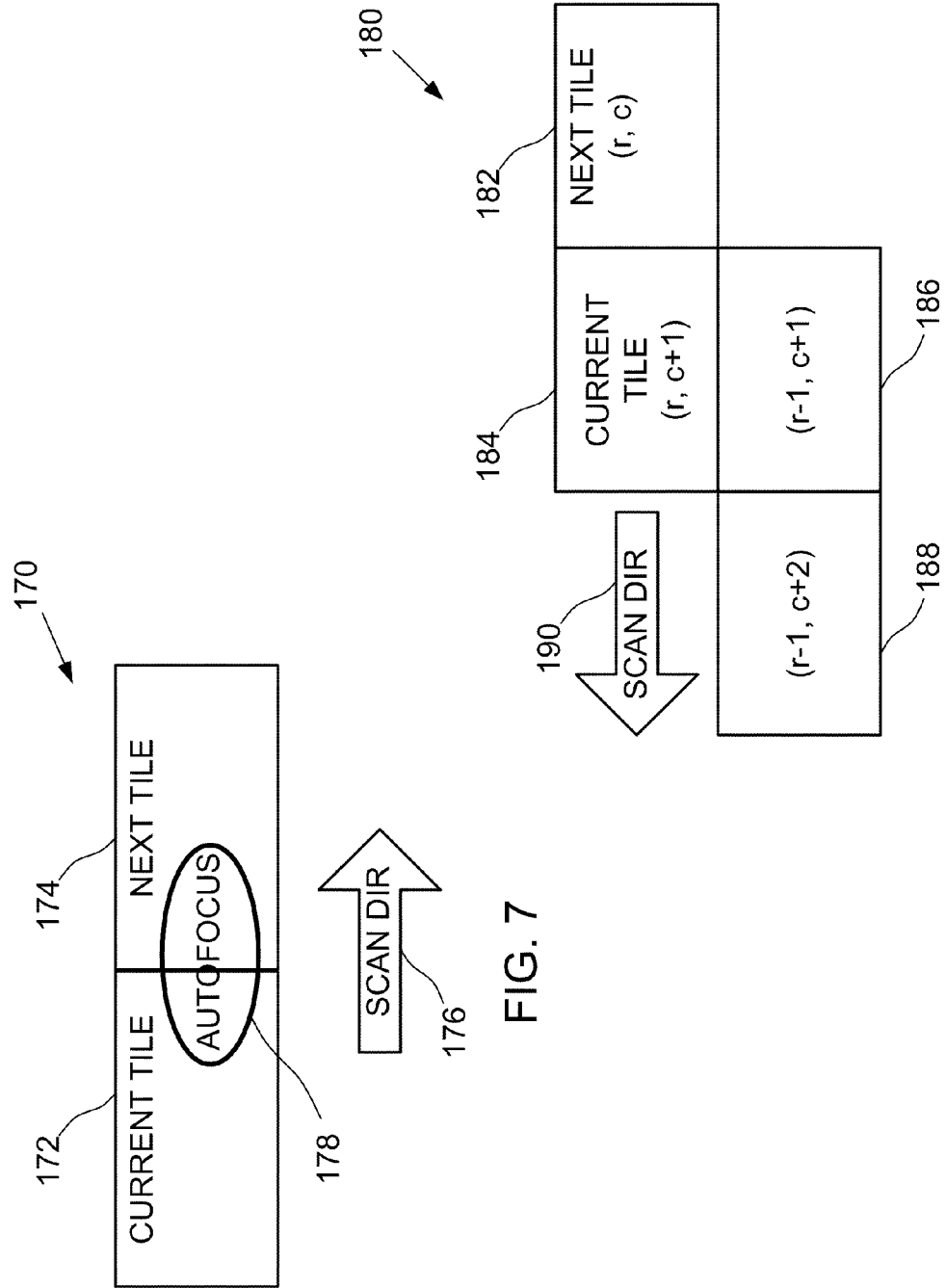

SYSTEM AND METHOD FOR ENHANCED PREDICTIVE AUTOFOCUSING

CROSS REFERENCE TO RELATED APPLICATIONS

This application is a continuation-in-part of U.S. patent application Ser. No. 11/843,754 entitled "PREDICTIVE AUTOFOCUSING", filed Aug. 23, 2007, which is herein incorporated by reference.

BACKGROUND

Embodiments of the present invention relate to imaging, and more particularly to predictive autofocusing of an imaging device.

Prevention, monitoring and treatment of physiological conditions such as cancer, infectious diseases and other disorders call for the timely diagnosis of these physiological conditions. Generally, a biological specimen from a patient is used for the analysis and identification of the disease. Microscopic analysis is a widely used technique in the analysis and evaluation of these samples. More specifically, the samples may be studied to detect presence of abnormal numbers or types of cells and/or organisms that may be indicative of a disease state. Automated microscopic analysis systems have been developed to facilitate speedy analysis of these samples and have the advantage of accuracy over manual analysis in which technicians may experience fatigue over time leading to inaccurate reading of the sample. Typically, samples on a slide are loaded onto a microscope. A lens or objective of the microscope may be focused onto a particular area of the sample. The sample is then scanned for one or more objects of interest. It may be noted that it is of paramount importance to properly focus the sample/objective to facilitate acquisition of images of high quality.

Digital optical microscopes are used to observe a wide variety of samples. Rapid autofocusing is important in automated biological and biomedical applications such as high-throughput pharmaceutical screening and large-scale autonomous microrobotic cell manipulation. Rapid autofocusing is also important in other applications such as integrated circuit chip inspection and microassembly of hybrid microelectromechanical systems (MEMS). Thus, rapid autofocusing is highly desirable in real-time image acquisition applications that cannot afford considerable time delays to adjust the focal distance between snapshots of the sample.

Conventional imaging devices perform autofocusing by directing a laser beam at the sample, measuring a reflection of the laser beam off the sample to provide a single reference point, and using a feedback loop to adjust the focal distance. Although this approach may provide rapid autofocusing, the single reference point may lack sufficient information for accurate autofocusing. Certain other presently available techniques also perform autofocusing by obtaining multiple images of a stationary sample at multiple focal distances, determining an optimal focal distance for each of the images and using a feedback loop to adjust the focal distance. Although this approach may provide more accurate autofocusing than the use of a laser beam, acquisition of the numerous images often creates time delays that prevent rapid autofocusing.

Moreover, in order to meet the scan speed requirements for digital slide scanners, autofocus calculations and adjustments may be performed while the stage is in continuous motion. In such cases, certain factors, such as, but not limited to, repeatable variations associated with the scanning stage and/or the sample may negatively influence the focus prediction resulting in unfocused images.

It may therefore be desirable to develop a robust technique and system configured to perform accurate rapid autofocusing in real-time image acquisition applications that advantageously facilitate enhanced scanning speed, while simultaneously maintaining image quality. Moreover, there is a need for a system that is configured to account for mechanical variations while performing accurate rapid autofocusing in real-time image acquisition applications.

BRIEF DESCRIPTION

In accordance with aspects of the present technique, in an imaging device having an objective and a stage for holding a sample to be imaged, a method for autofocusing is presented. The method includes determining a measured focus value corresponding to at least a first of a plurality of logical image segments. Further, the method includes imaging the first logical image segment using the measured focus value. The method also includes determining a predicted focus value for a second of the plurality of logical image segments using the measured focus value and a stored focus variation parameter. In addition, the method includes imaging the second logical image segment using the predicted focus value.

In accordance with another aspect of the present technique, an imaging device is presented. The device includes an objective lens. Also, the device includes a primary image sensor configured to generate a primary image of a sample at a primary frame rate. Furthermore, the device includes an auxiliary image sensor configured to generate one or more auxiliary images of the sample at an auxiliary frame rate that is faster than the primary frame rate. Additionally, the device includes a controller configured to adjust a focus value between the objective lens and the sample along an optical axis to autofocus the image of the sample. Moreover, the device includes a scanning stage to support the sample and move the sample in at least a lateral direction that is substantially orthogonal to the optical axis. In the imaging device, the controller is configured to determine a measured focus value corresponding to at least a first of a plurality of logical image segments, image the first logical image segment using the measured focus value, determine a predicted focus value for a second of the plurality of logical image segments using the measured focus value and a stored focus variation parameter, and image the second logical image segment using the predicted focus value.

In accordance with another aspect of the present technique, an imaging device is presented. The device includes an objective lens, a primary image sensor configured to generate a primary image of a sample at a primary frame rate, an auxiliary image sensor configured to generate one or more auxiliary images of the sample at an auxiliary frame rate that is faster than the primary frame rate, a controller configured to adjust a focus value between the objective lens and the sample along an optical axis to autofocus the image of the sample, a scanning stage to support the sample and move the sample in at least a lateral direction that is substantially orthogonal to the optical axis. In the imaging device, the controller includes a macro image and scan planning component to determine a scan plan of the sample, an autofocusing component to acquire and process auxiliary images, a motion control component to control motion of the sample relative to the objective, and a timing component to synchronize timing for acquisition of the auxiliary images, the primary images, or both.

DRAWINGS

These and other features, aspects, and advantages of the present invention will become better understood when the following detailed description is read with reference to the accompanying drawings in which like characters represent like parts throughout the drawings, wherein:

FIG. 7 is a diagrammatic illustration of a method of determining a predicted focus value, in accordance with aspects of the present technique;

FIG. 8 is a block diagram illustrating another method of determining a predicted focus value, in accordance with aspects of the present technique;

DETAILED DESCRIPTION

As will be described in detail hereinafter, a method and system for autofocusing a sample while optimizing scanning speed and maintaining image quality, are presented. By employing the method and device described hereinafter, substantially increased scanning speed and image quality may be obtained, while simplifying the clinical workflow of sample scanning.

Although, the exemplary embodiments illustrated hereinafter are described in the context of a medical imaging system, it will be appreciated that use of the imaging device in industrial applications are also contemplated in conjunction with the present technique.

Figure 1:
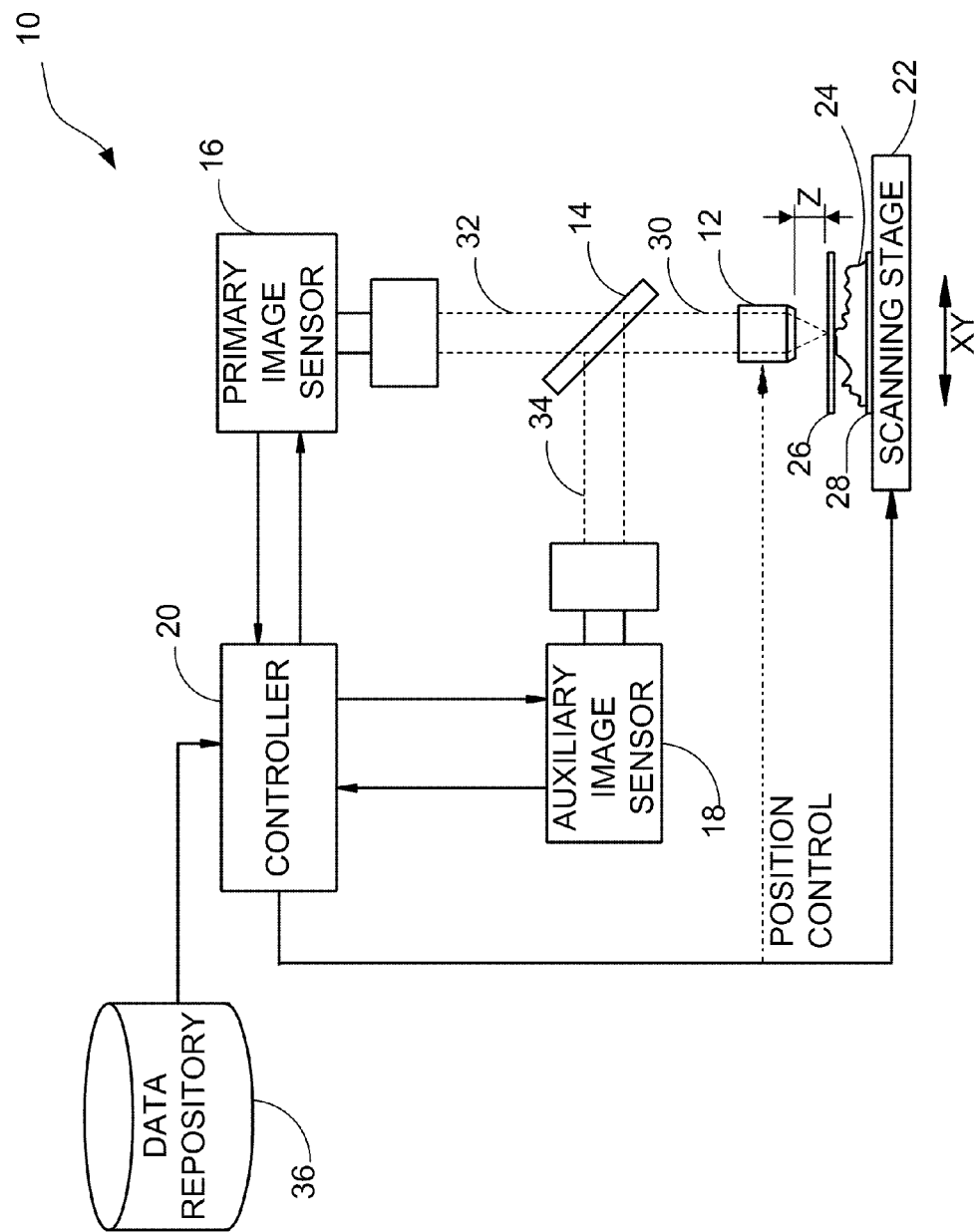
FIG. 1 is a block diagram of an imaging device, such as a digital optical microscope, in accordance with aspects of the present technique.

FIG. 1 illustrates one embodiment of an imaging device 10 that incorporates aspects of the present technique. In one embodiment, the imaging device 10 may represent a digital optical microscope. In the illustrated embodiment of FIG. 1, the imaging device 10 is shown as including an objective lens 12, a beam splitter 14, a primary image sensor 16, an auxiliary image sensor 18, a controller 20 and a scanning stage 22. Further, as depicted in FIG. 1, a sample 24 is disposed between a cover slip 26 and a slide 28, with the sample 24, the cover slip 26 and the slide 28 being supported by the scanning stage 22. The cover slip 26 and the slide 28 may be made of a transparent material such as glass, while the sample 24 may represent a wide variety of objects or samples. For example, the sample 24 may represent industrial objects such as integrated circuit chips or microelectromechanical systems (MEMS), and biological samples such as biopsy tissue including liver or kidney cells.

The beam splitter 14 is configured to split light 30 from the sample 24 into a primary light path 32 and an auxiliary light path 34. The primary light path 32 is directed to primary image sensor 16, and the auxiliary light path 34 is directed to the auxiliary image sensor 18. In one embodiment, the beam splitter 14 may be a partial reflection filter (or partially transparent mirror) that transmits one half of light 30 to the primary light path 32 and reflects the other half of light 30 to the auxiliary light path 34 when bright field imaging is used. Also, in one embodiment, the beam splitter 14 may be a wavelength discrimination filter (or dichroic mirror) that transmits light that includes the fluorescent excitation wavelength to the primary light path 32 and reflects light that excludes the fluorescent excitation wavelength to the auxiliary light path 34 when fluorescent imaging is used.

In one embodiment, the primary image sensor 16 may generate a primary image of the sample 24 at a particular field of view using the primary light path 32 without using the auxiliary light path 34. Moreover, the auxiliary image sensor 18 may generate an auxiliary image of the sample 24 at the same field of view, or at a region or regions of interest within the field of view, using the auxiliary light path 34 without using the primary light path 32. In one embodiment, the primary image sensor 16 generates the primary image with a primary pixel count at a primary frame rate, and the auxiliary image sensor 18 generates the auxiliary image(s) with an auxiliary pixel count at an auxiliary frame rate. In one embodiment, the auxiliary pixel count is substantially lower than the primary pixel count, and as a result, the auxiliary frame rate is substantially faster than the primary frame rate.

The primary image sensor 16 may represent any digital imaging device such as a commercially available charge-coupled device (CCD) based image sensor. Similarly, the auxiliary image sensor 18 may also be a commercially available CCD based image sensor. In one embodiment, the primary pixel count may be at least four times as large as the auxiliary pixel count, and the auxiliary frame rate may be at least four times as fast as the primary frame rate. Moreover, in one embodiment, the primary pixel count may be at least ten times as large as the auxiliary pixel count, and the auxiliary frame rate may be at least ten times as fast as the primary frame rate.

In accordance with exemplary aspects of the present technique, the prediction of a focus value for an upcoming logical image segment may be based upon nearest measured focus values in conjunction with predictable variation information associated with the imaging device 10. The auxiliary image sensor 18 may be configured to aid in the acquisition of auxiliary images, where the plurality of auxiliary images may be used to predict a focus value for an upcoming logical image segment. The primary image sensor 16 may then acquire a primary image corresponding to the upcoming logical image segment at the predicted focus value.

The objective lens 12 is spaced from the sample 24 by a distance that extends along an optical axis in the Z (vertical) direction, and the objective lens 12 has a focal plane in the X-Y plane (lateral or horizontal direction) that is substantially orthogonal to the Z or vertical direction. Moreover, the objective lens 12 collects the light 30 radiated from the sample 24 at a particular field of view, magnifies the light 30 and directs the light 30 to the beam splitter 14. The objective lens 12 may vary in magnification power depending, for example, upon the application and size of the sample features to be imaged.

Furthermore, in one embodiment, the objective lens 12 may be a high power objective lens providing a 20× or greater magnification and a 0.5 numerical aperture (small depth of focus). The objective lens 12 may be spaced from the sample 24 by a focus distance of a few millimeters (also referred to as a long working distance) and may collect the light 30 from a field of view of 750×750 microns in the focal plane. However, the working distance, field of view and focal plane may also vary depending upon the microscope configuration or characteristics of the sample 24 to be imaged. In one embodiment, the objective lens 12 may be coupled to a position controller such as a piezo actuator to provide fine motor control and rapid small field of view adjustments to the objective lens 12.

In one embodiment, the imaging device 10 may be a high-speed imaging device configured to rapidly capture a large number of primary digital images of the sample 24 where each primary image represents a snapshot of the sample 24 at a particular field of view representative of only a fraction of the entire sample. Each of the primary digital images may then be digitally combined or stitched together to form a digital representation of the entire sample 24. Prior to image scanning, a processor may be used to subdivide the sample 24 into a number of logical image segments representative of the primary digital images to be captured. The processor may then determine the most efficient order by which to capture the primary digital images based upon the relationship and relative locations of the logical image segments. This process of determining the sample scanning order is often referred to as "scan planning."

In accordance with one embodiment, the imaging device 10 may capture first, second and third auxiliary images of the sample 24 using the auxiliary image sensor 18 while the sample 24 is respectively positioned at first, second and third sample distances and at first, second and third lateral and/or horizontal positions. The term "sample distance" is used hereinafter to refer to the separation distance between the objective lens and the sample to be imaged. The controller 20 may vertically shift the objective lens 12 relative to the sample 24 in the Z-direction to obtain multiple auxiliary images at multiple sample distances. For example, the controller 20 may vertically shift the objective lens 12 while the scanning stage 22 and the sample 24 remain at a fixed vertical position. Alternatively, the controller 20 may vertically shift the scanning stage 22 and the sample 24 while the objective lens 12 remains at a fixed vertical position, or the controller 20 may vertically shift both the scanning stage 22 (and the sample 24) and the objective lens 12. In one embodiment, the imaging device 10 may determine a quantitative characteristic for the respective auxiliary images of the sample 24 captured at multiple sample distances. A quantitative characteristic represents a quantitative measure of image quality and may also be referred to as a quantitative figure of merit. In one embodiment, the imaging device 10 may determine a primary sample distance based upon at least the quantitative characteristics determined for the multiple auxiliary images. In turn, the controller 20 may adjust the distance between the objective lens 12 and the primary image sensor 16 to the determined primary sample distance and the primary image sensor 16 may capture the next primary image. As will be described in further detail, predictable focus variation information may also be used to determine a primary focus value for the next primary image. A primary image of the sample for the given field of view may be captured using the primary image sensor 16 at the predicted primary focus value and at a primary lateral position that is offset from the first, second and third lateral positions. By using a combination of the primary image sensor 16 coupled with an auxiliary image sensor 18 having a faster frame rate, overall capture rate of the entire sample 24 may be increased. The primary images so acquired may be stored in the data repository 36.

In one embodiment, the imaging device 10 may be configured to autofocus a sample based upon a measured focus value corresponding to a plurality of logical image segments and predictable focus variation parameters. In a presently contemplated configuration, the controller 20 may be configured to aid in the determination of a measured focus value for at least a first of a plurality of logical image segments and the determination of predicted focus values for one or more subsequent logical image segments based upon the measured focus value corresponding to the first logical image segment and any stored focus variation parameters. The working of the controller 20 will be described in greater detail with reference to FIGS. 2-10.

In accordance with exemplary aspects of the present technique, predictable and/or repeatable focus variation information associated with the imaging device 10 or the slide 28 may be used in combination with measured focus values corresponding to a current logical image segment to aid in enhanced prediction of focus values for upcoming logical image segments to be scanned. Accordingly, predictable focus variation information associated with the imaging device 10, and more particularly with the scanning stage 22 and/or the slide 28 with the sample 24 disposed thereon may be obtained. In one embodiment, repeatable variation information of the scanning stage 22 and/or the slide 28 may be characterized by scanning multiple slides and recording calculated focus values at various locations. It may be noted that in certain embodiments, the characterization of the repeatable variation information may be accomplished manually by a technician. Alternatively, control software may be configured to accumulate this information automatically under normal operations and thus "learn" how to accurately predict focus at various locations. In certain other embodiments, repeatable variations associated with the scanning stage 22 and/or the slide 28 may be characterized by using a calibration slide or other measuring devices. The repeatable focus variation information such as wobble and tilt corresponding to the scanning stage 22 may be acquired for each lateral and horizontal (x, y) position of the scanning stage 22. In addition, repeatable variation information of the slide 28, such as a slope of the slide 28, may be acquired for a wide variety of slides. Furthermore, the repeatable variation information of the scanning stage 22 and/or the slide 28 corresponding to each lateral and horizontal (x, y) position may be stored in the form of focus variation parameters in, for example, data repository 36.

Figure 2:
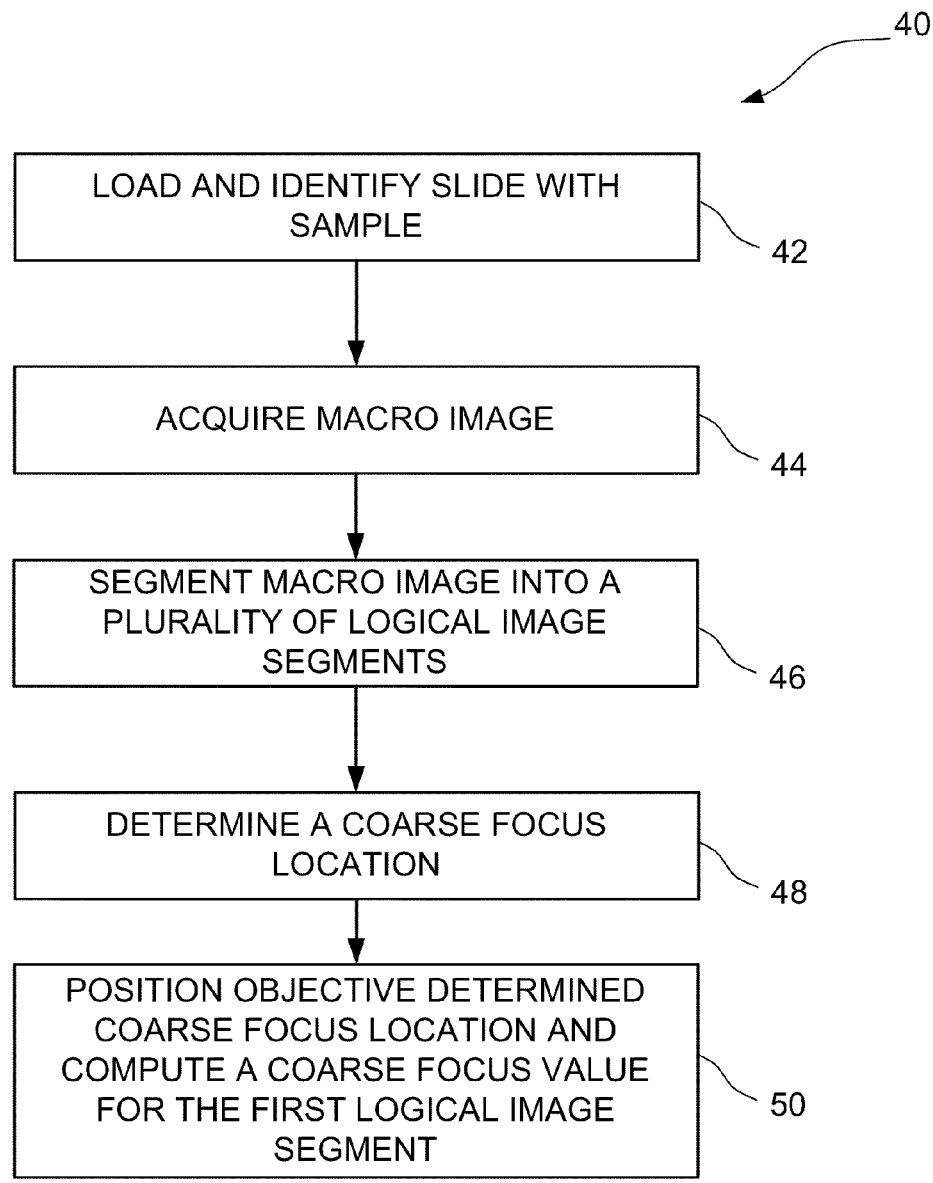
FIG. 2 is a flow chart illustrating an exemplary process of determining a coarse focus value for autofocusing a sample, in accordance with aspects of the present technique.

Turning now to FIG. 2, a flow chart 40 illustrating an exemplary method for initializing a sample for high-speed scanning is depicted. The method starts at step 42 where a slide containing a sample is loaded onto an imaging device. By way of example, the slide 28 with the sample 24 may be loaded onto the scanning stage 22 of the imaging device 10 (see FIG. 1). In addition, the slide 28 may be identified or otherwise characterized as being a member of a particular slide type. The slide identification may be performed manually, however the slide identification may also be determined automatically by the imaging device 10 based upon identifiable markings or characteristics of the slide. This identification of a slide type, for example, may facilitate subsequent retrieval of any stored focus variation parameters associated with the identified slide type from a data repository.

Subsequently, at step 44, a macro image of the entire sample 24 may be acquired and the macro image may then be segmented into a plurality of logical image segments at step 46. As previously alluded to, logical image segments represent sub-sections of the macro image, which when computationally stitched or combined together substantially correspond to the portions of the sample to be imaged. Each logical image segment may be adjacent to one or more other logical image segments, however this is not required. Moreover, logical image segments may overlap one or more adjacent image segments by a small amount to facilitate image stitching, for example. Furthermore, logical image segments may take the form of a variety of geometrical shapes including circular and hexagonal shapes, however square and rectangular image segments are most typically used. Such logical image segments may be commonly referred to as image tiles. The process of segmenting the macro image of the sample into a plurality of logical image segments may be performed as part of a scan planning process.

Moreover, as indicated by step 48 a coarse focus location corresponding to a region of the sample 24 may be determined based on the acquired macro image. Subsequently, an objective, such as the objective 12 may be positioned with respect to the sample at a focus distance corresponding to the coarse focus value, as depicted by step 50. Additionally, at step 50, a course focus value may then be determined. In one embodiment, the coarse focus value may be determined by obtaining a plurality of images while varying the sample distance, computing quantitative characteristics (figures of merit) at each distance and determining the best sample distance to optimize the quantitative characteristics. Furthermore, in one embodiment, a number of images in a range from about 10 to about 50 may be acquired while varying the sample distance. Quantitative characteristics corresponding to each image may be computed. Subsequently, three of the "best" quantitative characteristics may be identified. Specifically, in one embodiment, a quantitative characteristic with a maximum value may be identified. In addition, two other quantitative characteristics that are adjacently disposed to the quantitative characteristic with the maximum value may also be identified. In one embodiment, the two quantitative characteristics adjacently located on either side of the quantitative characteristic with the maximum value may be selected. A unimodal function may be fit to the three identified "best" quantitative characteristics and a mode of the unimodal function may be determined. In one embodiment, the unimodal function may include a Lorentzian distribution or a quadratic distribution. Also, in one embodiment, the mode of the function may include a vertex of the unimodal function. A coarse focus value may be determined based on the identified mode or vertex of the unimodal function. However, other techniques may be used to determine the coarse focus value. This coarse focus value may then be used as a starting focus value for the scanning process. This coarse focus value may be stored in the data repository 36 for future use.

Figure 3:
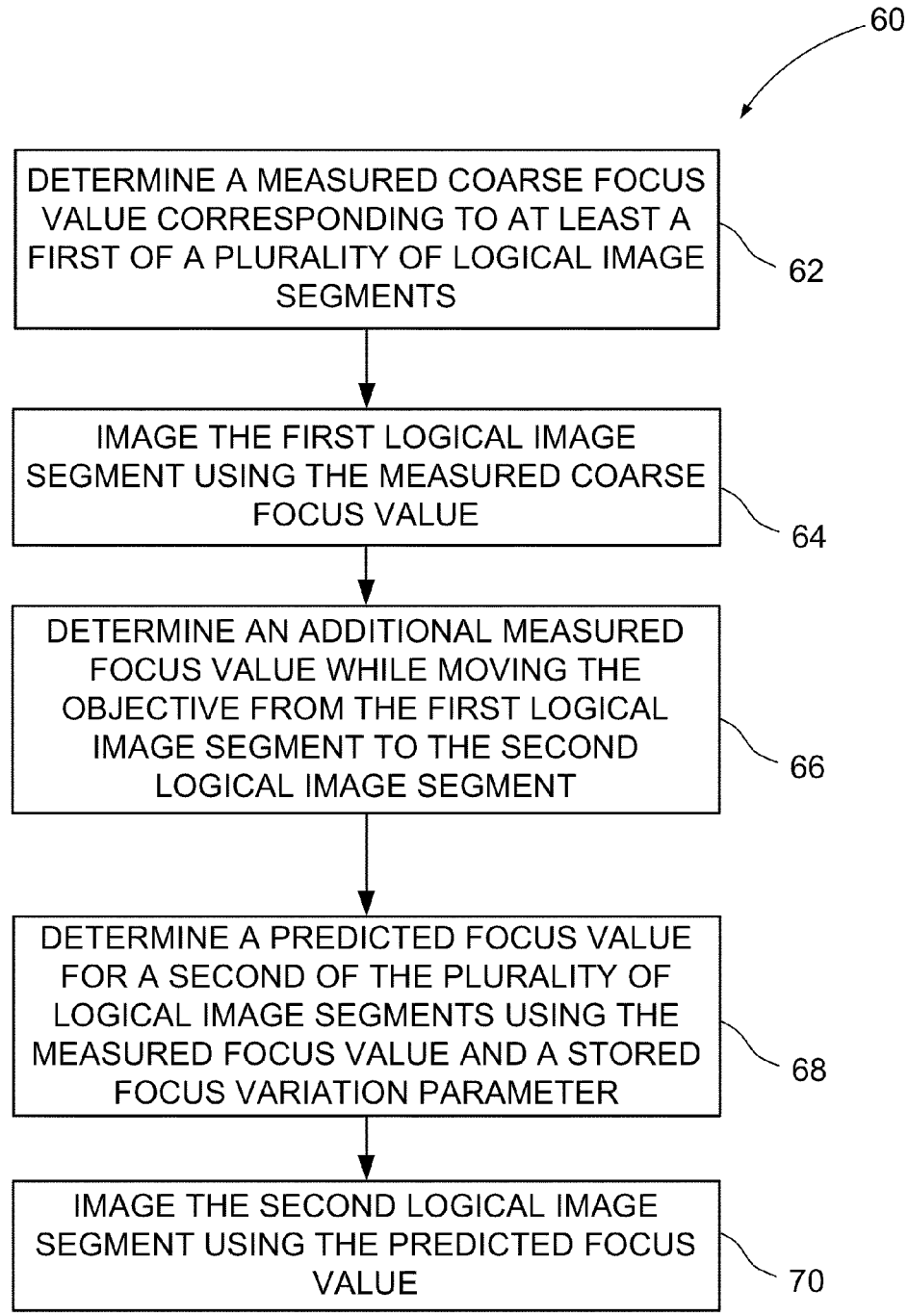
FIG. 3 is a flow chart illustrating an exemplary process of autofocusing a sample, in accordance with aspects of the present technique.

FIG. 3 is a flow chart 60 illustrating an exemplary method of autofocusing during a high-speed image scanning process in accordance with aspects of the present technique. More particularly, a method for autofocusing a sample supported on a stage of an imaging device is presented. As previously noted, a slide, such as the slide 28, containing the sample 24 may be loaded onto the scanning stage 22 of the imaging device 10 (see FIG. 1). Also, the objective 12 may be positioned at a sample distance corresponding to the determined coarse focus value for the first logical image segment in the sample 24.

Figure 4A:
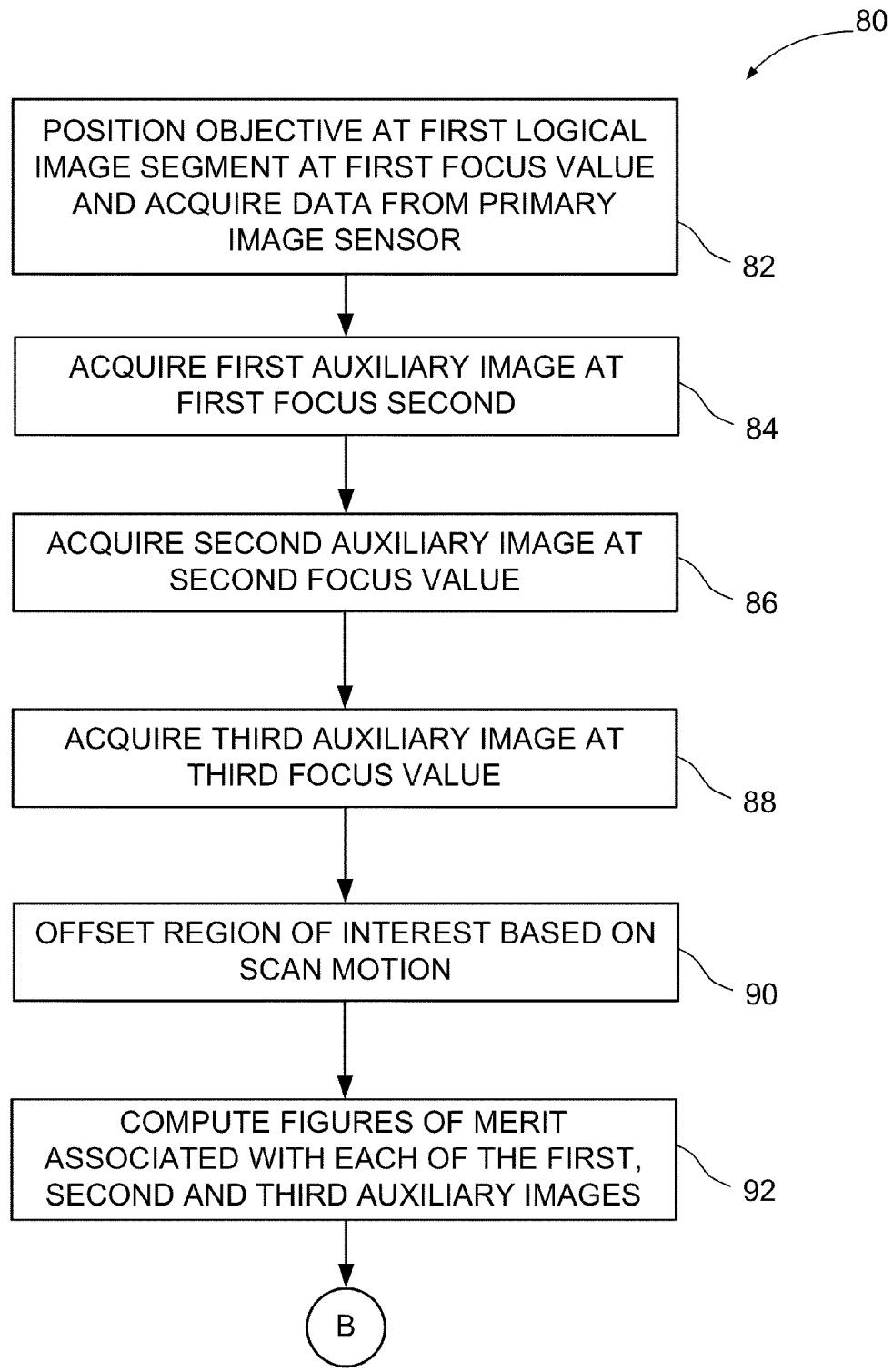
FIGS. 4A-4B are flow charts illustrating an exemplary process for determining a predicted focus value for autofocusing a sample, in accordance with aspects of the present technique.
Figure 4B:
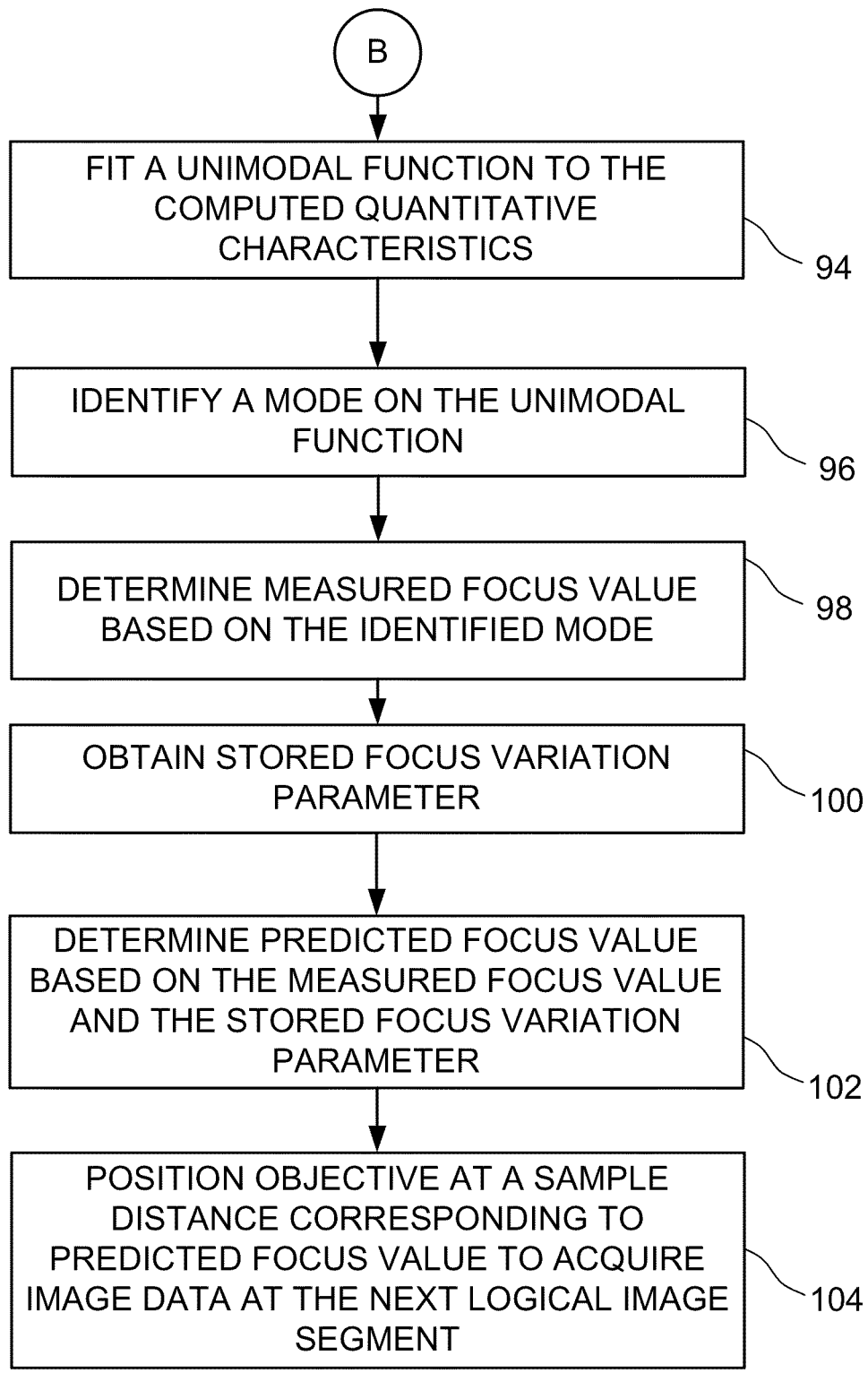

The method begins at step 62 where a measured coarse focus value corresponding to at least a first of a plurality of logical image segments to be scanned is determined. Step 62 may be better understood with reference to FIG. 4, a flow chart 80 depicting an exemplary method for determining a measured focus value corresponding to the first logical image segment. Referring now to FIG. 4, the method starts at step 82 where the objective is positioned at a first focus value corresponding to the first logical image segment to be scanned. In one embodiment, the first focus value may correspond to the coarse focus value determined at step 48 of FIG. 2. Furthermore, image data may be acquired by the primary image sensor 16 (see FIG. 1) while the objective 12 is positioned at a first focus value corresponding to the first logical image segment to be scanned.

Subsequently, a plurality of auxiliary images of the sample 24 may be acquired at different focus values to facilitate autofocusing. In one embodiment, at least three auxiliary images of the sample 24 may be acquired. The imaging device 10, and more particularly, the auxiliary image sensor 18 (see FIG. 1) may capture a first auxiliary image at a first focus value (step 84), a second auxiliary image at a second focus value (step 86), and a third auxiliary image at a third focus value (step 88). In one embodiment, the focus distance between the sample 24 and the objective 12 may be varied between each auxiliary image resulting in different focus values for the images.

Furthermore, in one embodiment, the controller 20 (see FIG. 1) may control the movement of the objective 12 in the Z-direction to facilitate acquisition of the three auxiliary images. More particularly, the controller 20 may communicate with a position control or a position controller configured to move the objective 12 in the Z-direction to each of the first, second and third focus values to acquire the first, the second and the third auxiliary images, respectively. In one embodiment, the position controller may be a piezo actuator coupled to the objective 12.

However, while the first, the second and the third auxiliary images are being acquired via the objective 12, the slide 28 mounted on the scanning stage 22 is moving in a direction (e.g., X-Y direction) that is substantially perpendicular to a direction of motion (e.g., Z-direction) of the objective 12. Consequently, the content being imaged changes as the slide 28 moves along with the scanning stage 22. Hence, the image content in the field of view of the objective 12 changes while each of the three auxiliary images is acquired. It may therefore be desirable to offset a region of interest by a determined amount in order to maintain a substantially similar image content in the field of view corresponding to the three auxiliary images. Accordingly, as indicated by step 90, the regions of interest associated with the three auxiliary images may be offset by a determined amount to identify image content that is common to the three auxiliary images. In one embodiment, the offset value may be determined based upon the speed of the scanning stage 22. By offsetting the regions of interest associated with the three auxiliary images, a largest data set (image content) that is common to the three auxiliary images may be selected.

Figure 5:
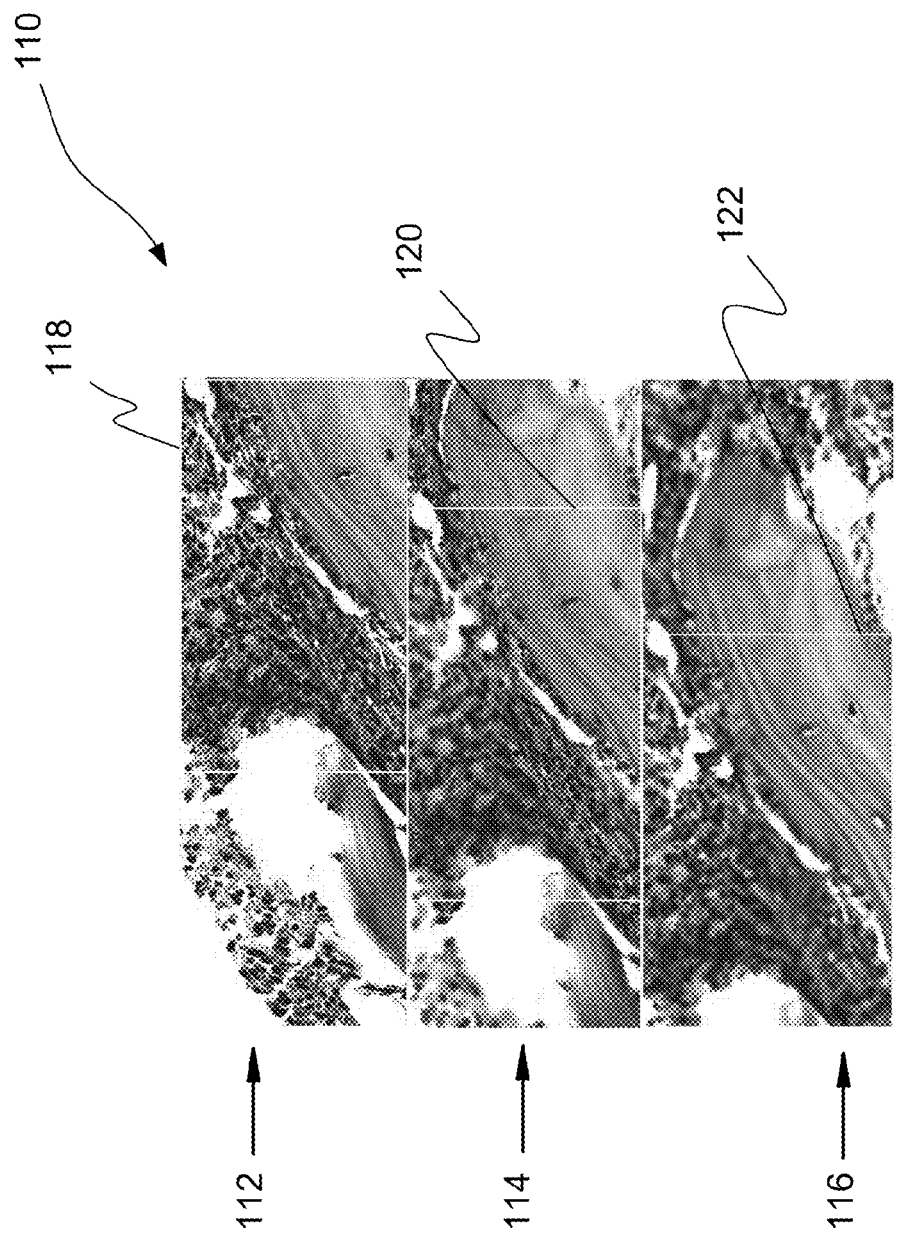
FIG. 5 is a diagrammatic illustration of the method of selecting a subset of common pixels, in accordance with aspects of the present technique.

Step 90 may be better understood with reference to FIG. 5. Turning now to FIG. 5, a diagrammatic illustration 110 of a method of offsetting a region of interest associated with the three auxiliary images is depicted. Reference numeral 112 may be representative of a first auxiliary image acquired at a first focus value, while a second auxiliary image acquired at a second focus value may be represented by reference numeral 114. Further, reference numeral 116 may generally be representative of a third auxiliary image acquired at a third focus value.

As depicted in FIG. 5, image content in each of the three auxiliary images 112, 114, 116 changes due to lateral or horizontal movement of the sample 24 relative to the objective 12. As previously noted, in order to process a substantially similar set of image data corresponding to the three auxiliary images, it may be desirable to offset the region of interest of the image by a determined amount for each of the three auxiliary images 112, 114, 116.

In the present example, a region of interest corresponding to the first auxiliary image 112 is represented by reference numeral 118. Furthermore, due to the scanning motion between the acquisition of the first auxiliary image 112 and the second auxiliary image 114, the image content of the second auxiliary image 114 corresponding to the region of interest 118 is different from the image content of the first auxiliary image 112 corresponding to the same region of interest 118. In accordance with aspects of the present technique, the region of interest 118 may be offset by a determined amount to facilitate selection of image content in the second auxiliary image 114 that is substantially similar to the image content in the first auxiliary image corresponding to the region of interest 118. Reference numeral 120 may generally be representative of an offset region of interest associated with the second auxiliary image 114. In a similar fashion, an offset region of interest may be generated for the third auxiliary image 116 to enable selection of image content that is substantially similar to the image content in regions of interest 118 and 120. Reference numeral 122 may generally be representative of an offset region of interest associated with the third auxiliary image 116. In one embodiment, by offsetting the region of interest for each of the auxiliary images the largest subset of image data that is common to the three auxiliary images 112, 114, and 116 may be selected.

With returning reference to FIG. 4, subsequent to step 90, quantitative characteristics associated with each of the three auxiliary images may be computed, as indicated by step 92. More particularly, quantitative characteristics corresponding to each of the three auxiliary images 112, 114, 116 may be computed using the selected image content corresponding to the regions of interest 118, 120 and 122 (see FIG. 5). Accordingly, quantitative characteristics may be computed on a region that shifts in synchrony with the scanning motion so that the same region is evaluated at each focal distance. In one embodiment, the controller 20 may be configured to aid in determining the quantitative characteristics corresponding to each of the three auxiliary images 112, 114, 116.

In accordance with one embodiment of the present technique, the imaging device 10 may utilize the quantitative characteristics as part of one or more focus algorithms as a basis to bring the sample 24 into focus. Furthermore, the quantitative characteristics may have a maximum value at the optimal focus value and decreasing value as the focus decreases, or alternatively, a minimum value at the optimal focus value and increasing value as the focus decreases. Focus algorithms that use derivative-based quantitative characteristics assume that well-focused images have more high-frequency content than defocused images. Focus algorithms that use statistics-based quantitative characteristics distinguish focused images from defocused images using variance and correlation. Also, focus algorithms that use histogram-based quantitative characteristics use histograms (the number of pixels with a given intensity in an image) to analyze the distribution and frequency of image intensities. Focus algorithms that use intuitive quantitative characteristics sum the pixel intensities above a threshold. Thus, the quantitative characteristics may be based on a variety of image characteristics including, but not limited to contrast, entropy, variance, spatial frequency content, autocorrelation and total image intensity. Furthermore, the best quantitative characteristic may depend on the imaging mode. For instance, normalized variance may provide better overall performance for bright field, phase contrast and differential interference contrast, whereas autocorrelation may provide better overall performance for fluorescence. Likewise, the derivative-based Brenner gradient quantitative characteristic computes a first difference between a pixel and its neighbor with a horizontal/vertical distance of two and is well suited for transmitted bright field imaging, for example.

Once the quantitative characteristics corresponding to the three auxiliary images 112, 114, 116 are determined, these quantitative characteristics may be interpolated to determine a measured focus value, as indicated by step 94. More particularly, in one embodiment, the quantitative characteristics may be interpolated by fitting the quantitative characteristics to a unimodal function to facilitate determination of a measured focus value corresponding to a current logical image segment. The unimodal function may include a Lorentzian distribution, a parabolic distribution, or the like.

In one embodiment, the imaging device 10 may determine an optimal focus value for acquiring a primary image corresponding to the current logical image segment based on the quantitative characteristics associated with the auxiliary images 112, 114, 116. For example, the imaging device 10 may select the optimal focus value based on the maximum quantitative characteristic of the auxiliary images, based on interpolation of a maximum focus value using the quantitative characteristics of the auxiliary images, or by fitting at least three quantitative characteristics to the unimodal function or a distribution function and interpolating the maximum focus from the unimodal function or the distribution function. In one embodiment, the imaging device 10 uses the Brenner Gradient with n=2 to determine respective quantitative characteristics for one or more auxiliary images. Moreover, in one embodiment, the imaging device 10 may interpolate the optimal focus value for a current logical image segment using quantitative characteristics for the three auxiliary images as applied to a Lorentzian distribution. In another embodiment, the imaging device 10 may interpolate the optimal focus value for a current logical image segment by recognizing that the focus values as a function of the position of the sample 24 are locally quadratic and using parabolic interpolation.

In accordance with one aspect of the present technique, it has been discovered that the relationship between Brenner Gradients for a series of images and the respective depth from focus for those images may be approximated by a Lorentzian distribution. Additionally, in accordance with one embodiment of the present technique, it has further been determined that a quadratic distribution may be approximated from a plot of the inverse of the Brenner Gradients for a series of images versus the respective position of the sample 24. Moreover, it has been found that an optimal focus value that would render a focused image corresponds to a minimum on such a quadratic distribution. Subsequently, at step 96, a mode of the unimodal function may be identified. It may be noted that the mode of the unimodal function may include a vertex of the unimodal function, in certain embodiments. Furthermore, in one embodiment, the mode of the curve may be a minimum, while in certain other embodiments, the mode of the unimodal function may be a maximum.

Additionally, in accordance with an aspect of the present technique, it has further been determined that the Brenner Gradient in the vicinity of the best focus is well approximated by a quadratic function of the position of the sample 24. Moreover, it has been found that an optimal focus value that would render a focused image corresponds to a maximum on such a quadratic distribution. Accordingly, at step 96, a vertex of the resulting parabola may be identified. As before, the vertex value may be used to determine a measured focus value corresponding to the current logical image segment.

The mode value may be used to determine a measured focus value corresponding to the current logical image segment, as indicated by step 98. More particularly, at step 98, a measured focus value for the current logical image segment may be determined based upon the mode value identified at step 96.

In accordance with exemplary aspects of the present technique, predictable focus variation information may be used in conjunction with a measured focus value corresponding to a current logical image segment to predict an optimal focus value for a subsequent logical image segment. The predictable focus variation information corresponding to a subsequent logical image segment to be scanned may be retrieved or otherwise determined as indicated by step 100. In one embodiment, stored focus variation parameters that are representative of predictable focus variation information associated with the scanning stage 22 and/or the slide 28 may be retrieved from the data repository 36 (see FIG. 1), for example. In one example, stored focus variation parameters associated with a subsequent position (e.g., the (x, y) position) of the scanning stage 22 and/or the slide 28 may be retrieved from the data repository 36.

Furthermore, as previously noted, an optimal focus value for each logical image segment to be scanned may be predicted based upon at least the measured focus value corresponding to a current logical image segment and any corresponding stored focus variation parameters. Accordingly, at step 102, an optimal focus value for a sequentially next logical image segment remaining to be scanned may be predicted based upon the measured focus value corresponding to a current logical image segment and any corresponding stored focus variation parameters. By way of example, at step 102, a predicted focus value for the sequentially next logical image segment may be determined based upon the measured focus value corresponding to the current logical image segment determined at step 98 and any corresponding stored focus variation parameters retrieved at step 100. Also, the stored focus variation parameters associated with the scanning stage 22 may include previously determined wobble and/or tilt information associated with the scanning stage 22 or repeatable characteristics of the slide 28.

Subsequently, at step 104, the objective 12 may be positioned at a sample distance corresponding to the predicted focus value to facilitate acquisition of image data at the sequentially next logical image segment. Additionally, image data or a primary image may be acquired at the sequentially next logical image segment while the objective is positioned at the sample distance corresponding to the predicted focus value.

With returning reference to FIG. 3, at step 64, the first logical image segment may be imaged using the measured coarse focus value corresponding to the first logical image segment. More particularly, the primary image sensor 16 (see FIG. 1) may capture a first primary image corresponding to the first logical image segment while the objective 12 is positioned at a sample distance corresponding to the measured focus value for the first logical image segment. Also, the measured coarse focus value corresponding to the first logical image segment may be stored in the data repository 36 for future use.

Subsequently, at step 66, an additional measured focus value may be determined while moving the objective 12 from the first logical image segment to a sequentially next logical image segment. In one embodiment, the sequentially next logical image segment may include a second logical image segment.

In accordance with further aspects of the present technique, the focus value for the second logical image segment may be predicted using a measured focus value associated with a nearest neighbor of the second logical image segment with adjustments for predictable focus variation information associated with the imaging device 10. More particularly, prior to the scanning stage 22 positioning the sample 24 at a location corresponding to the second logical image segment to be scanned, a focus value for the second logical image segment may be predicted. By way of example, the focus value for the second logical image segment to be scanned may be predicted based upon the measured focus value for the first logical image segment (determined at step 66, for example) and one or more stored focus variation parameters, as indicated by step 68.

Once the predicted focus value for the second logical image segment is determined, the objective 12 may be positioned at a sample distance corresponding to the predicted focus value to facilitate acquisition of image data at the second logical image segment. More particularly, the controller 20 (see FIG. 1) may adjust the distance between the objective lens 12 and the sample 24 to the predicted focus value prior to the arrival of the objective 12 relative to the second logical image segment. Subsequently, at step 70, the second logical image segment may be imaged using the determined predicted focus value corresponding to the second logical image segment. For example, in one embodiment, the primary image sensor 16 (see FIG. 1) may capture a second primary image corresponding to the second logical image segment while the objective 12 is positioned at a sample distance corresponding to the predicted focus value corresponding to the second logical image segment. Here again, the predicted focus value corresponding to the second logical image segment may be stored in the data repository 36 for future use.

By implementing the method of autofocusing as described hereinabove, a predicted focus value for the second logical image segment may be determined while the sample 24 is repositioned from a first position corresponding to the first logical image segment to a second position corresponding to the second logical image segment. Consequently, a significant increase in scan speed may be obtained as the predicted focus value for the second logical image segment is computed while the sample is repositioned from the first position corresponding to the first logical image segment to the second position corresponding to the second logical image segment. By circumventing the need to adjust focus after arriving at the second logical image segment the scanning speed may be enhanced. Also, as the predicted focus value is determined using nearby measured focus values with adjustments for predictable variation, accurate prediction of the focus value is obtained with minimal decrease in image quality.

It may be noted that the remaining plurality of logical image segments may be scanned, while adjusting the focus between each of the plurality of logical image segments as described with reference to FIGS. 2-5. Specifically, a predicted focus value for a sequentially next logical image segment may be determined based upon a measured focus value of a current logical image segment that is adjusted for predicted variation due to the scanning stage 22 and/or the slide 28.

In accordance with further aspects of the present technique, the predicted focus value for a subsequent or sequentially next logical image segment may also be determined based upon a measured focus value corresponding to a current logical image segment, or a measured focus value corresponding to an adjacent logical image segment from a previous row. However, an average of the measured focus value corresponding to a current logical image segment and the measured focus value corresponding to an adjacent logical image segment from a previous row may be used to determine a predicted focus value for a sequentially next logical image segment. Moreover, in accordance with further aspects of the present technique, if measured focus values corresponding to neither the current logical image segment nor the adjacent logical image segment from a previous row are available, then a measured focus value corresponding to a "nearest neighbor" logical image segment may be used in conjunction with predicted variation information to determine a predicted focus value for the sequentially next logical image segment. Accordingly, an optimal focus value for an upcoming logical image segment to be scanned may be predicted using a combination of previously determined measured focus values and predictable focus variation information. By way of example, measured focus values from a current row and a previous column, or measured focus values from a current column and a previous row, or an average of both may be used. However, if neither value is available, then a nearest measured focus value is identified and used in combination with the predictable focus variation information to predict an optimal focus value for an upcoming logical image segment.

Furthermore, the plurality of logical image segments corresponding to the first region may be scanned to acquire primary images corresponding to the plurality of logical image segments as described hereinabove, while adjusting a focus between the logical image segments. Once the first region is scanned, other regions, if any, in the sample 24 may also be scanned as described hereinabove. In certain embodiments, the primary images acquired may be post-processed to facilitate visualization of images, where the visualized images may aid a clinician in the diagnosis of disease states. By way of example, the primary images may be processed via application of an image registration process. Subsequently, the registered images may be stitched to generate a consolidated image. Also, the image may be compressed and processed for storage. In certain embodiments, the processed images may be stored in the data repository 36. Once all the regions in the sample 24 have been scanned, the scanning stage 22 may be lowered and the slide 28 may be replaced with another slide.

Figure 6:
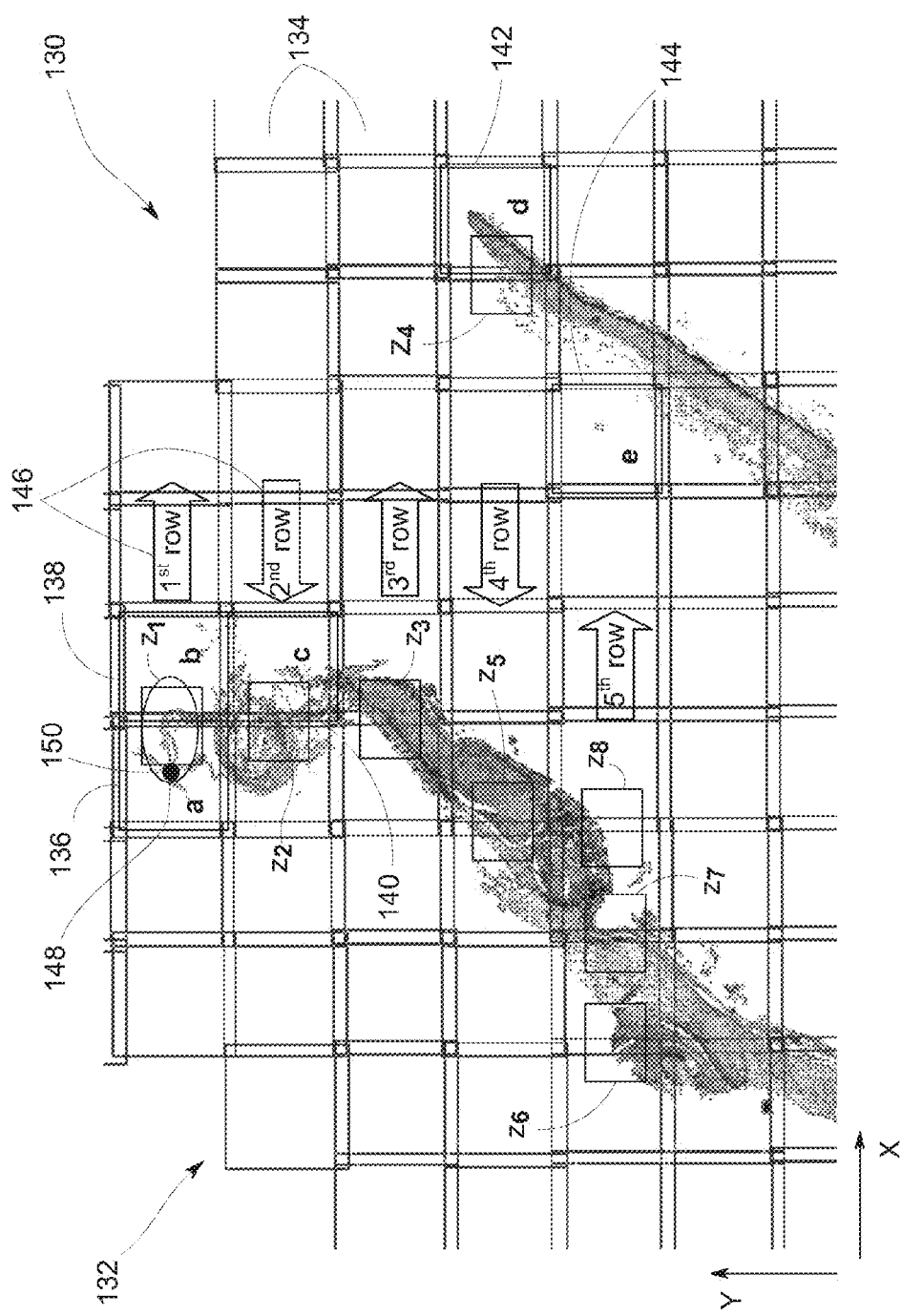
FIG. 6 is a diagrammatic illustration of a method of autofocusing a sample, in accordance with aspects of the present technique.

The method of autofocusing described hereinabove may be better understood with reference to FIG. 6. Referring now to FIG. 6, a diagrammatic illustration 130 of a method of autofocusing during a high speed scanning process, in accordance with aspects of the present technique, is depicted. As previously noted, in the imaging device 10 (see FIG. 1) having the objective 12 and the scanning stage 22 for holding the sample 24, a method for autofocusing includes loading the slide 28 on the scanning stage 22 and identifying the slide 28 containing the sample 24. The slide 28 may be identified to facilitate retrieval of corresponding stored focus variation parameters from the data repository 36. Subsequently, a macro image 132 of the sample 24 may be acquired to aid in preparation of a scan plan for the sample 24. More particularly, using the macro image 132, the sample 24 may be segmented into a plurality of regions, where each of the plurality of regions may include a plurality of logical image segments. It may be noted that in certain embodiments, the macro image 132 may be directly segmented into a plurality of logical image segments in the absence of more than one region. In the example of FIG. 6, the macro image 132 is directly segmented into a plurality of logical image segments, generally represented by reference numeral 134.

Furthermore, in the present example, reference numeral 136 may generally be indicative of a starting logical imaging segment based on a given scan plan. It may be noted that the terms starting logical imaging segment and first logical imaging segment may be used interchangeably. Also, reference numeral 138 may be representative of a second logical image segment, while a third logical image segment may be represented by reference numeral 140. Similarly, reference numeral 142 may be representative of a fourth logical image segment, while reference numeral 144 may be representative of a fifth logical image segment. It may be noted that for the purpose of illustration in the present example, the method of autofocusing is described with reference to only a selected subset of logical image segments, namely, the first, the second, the third, the fourth and the fifth logical image segments 136, 138, 140, 142 and 144. Also, reference numeral 146 may be representative of a direction of scan. Moreover, as previously noted, the macro image 132 may be utilized to determine a coarse focus location 148 prior to initiating the scanning of the sample 24. In the present example, the coarse focus location 148 corresponding to the macro image 132 may be determined prior to starting the scanning of the logical image segments of the sample 24, and this coarse focus location 148 also corresponds to the starting logical image segment 136 where the first primary image will be acquired. Accordingly, as illustrated in the present example, a coarse focus value may be determined at the initial coarse focus location 148 corresponding to the starting logical image segment 136 by acquiring a plurality of auxiliary images at different sample distances and calculating the optimal sample distance as described previously.

Subsequently, the scanning of the sample 24 may be initiated based upon the coarse focus value determined at the initial coarse focus location 148. The objective 12 may then be positioned at a sample distance corresponding to the determined coarse focus value relative to the sample 24 at the starting logical image segment 136. More particularly, the focus value may be adjusted to the coarse focus value such that a field of view is in focus, and the image for the starting logical image segment 136 may be acquired.

Following the determination of the coarse focus value and acquisition of the primary image for starting logical image segment 136, a measured focus value for the first logical image segment 138 may be determined, in accordance with further aspects of the present technique. More particularly, the measured focus value corresponding to the first logical image segment 136 may be determined while the sample 24 is repositioned from the starting logical image segment 136 to a second position, namely a center of the second logical image segment 138. This measured focus value corresponding to the first logical image segment 136 may then be used in preparation for imaging a sequentially next logical image segment to be scanned, such as the second logical image segment 138, for example. As previously noted, the measured focus value may be determined by acquiring at least three auxiliary images at corresponding focus values. For example, the first auxiliary image may be obtained at a first focus value that is substantially equal to the coarse focus value, the second auxiliary image may be obtained at a second coarse value that is less than the coarse focus value and a third auxiliary image may be obtained at third focus value that is greater than the coarse focus value. Moreover, the region of interest within the three auxiliary images may be offset to enable selection of image content that is common to the three auxiliary images.

In addition, quantitative characteristics corresponding to the selected image content of the three auxiliary images may be computed. The three quantitative characteristics may then be interpolated to obtain a measured focus value in preparation for imaging the second logical image segment 138. More particularly, a unimodal function, such as a Lorentzian distribution, may be fit to the three quantitative characteristics corresponding to the three auxiliary images. A mode of the unimodal function may be identified, where the mode of the curve may be indicative of the measured focus value in preparation for imaging the second logical image segment 138. Meanwhile, the measured focus value may be stored in the data repository 36 for use in the computation of predicted focus values for other logical image segments in the sample 24.

In accordance with further aspects of the present technique, any stored focus variation parameters associated with a current (x, y) location of the sample 24 may be retrieved from the data repository 36. Subsequently, a predicted focus value may be determined based upon the measured focus value and the stored focus variation parameters, if any. In certain embodiments, the predicted focus value may be stored in the data repository 36.

By way of example, as illustrated in FIG. 6, a measured fine focus value $z_1$ in preparation for imaging the second logical image segment 138 may be computed in a region 150 beginning at the starting logical image segment 136 and continuing into the second logical image segment 138. Consequently, the predicted focus value corresponding to the second logical image segment 138 is determined prior to the arrival of a center of the second logical image segment 138 relative to the objective 12. A primary image corresponding to the second logical image segment 138 may then be acquired with the objective 12 positioned at a sample distance corresponding to the predicted focus value. The primary image may be stored in the data repository 36. Also, by determining the predicted focus value as described hereinabove the scanning speed may be enhanced as the scanning stage 22 need not be stopped at the second logical image segment 138 to accommodate determination of a measured focus value corresponding to the second logical image segment 138.

In accordance with aspects of the present technique, a predicted focus value for a sequentially next logical image segment may be determined based upon a measured focus value corresponding to a current logical image segment. As previously noted, in one embodiment, the method of autofocusing may include determining a predicted focus value for a sequentially next logical image segment based upon a measured focus value corresponding to a current logical image segment and any relevant stored focus variation parameters. In the present example, a current logical image segment may include the first logical image segment 136 and the next logical image segment may include the second logical image segment 138. This method of autofocusing may be better understood with reference to FIG. 7.

Turning now to FIG. 7, a diagrammatical illustration 170 of an exemplary method of autofocusing is depicted. More particularly, the method of autofocusing by determining a predicted focus value for a sequentially next logical image segment 174 based upon a measured focus value corresponding to a current logical image segment 172 is presented in FIG. 7. It may be noted that in the example illustrated in FIG. 7, the sequentially next logical image segment 174 is disposed adjacent to the current logical image segment 172. As previously noted, predictable focus variation information corresponding to the sequentially next logical image segment 174 may be retrieved from the data repository 36 (see FIG. 1) to aid in determining the predicted focus value for the sequentially next logical image segment 174. Reference numeral 176 is representative of a scan direction. Also, according to exemplary aspects of the present technique, the determination of the predicted focus value for the sequentially next logical image segment 174 is performed while the sample is repositioned from a first position corresponding to the current logical image segment 172 to a second position corresponding to the sequentially next logical image segment 174 as indicated by reference numeral 178. By determining a predicted focus value for the sequentially next logical image logical image segment 174 and implementing the corresponding focus value adjustments while the sample is repositioned from a first position corresponding to the current logical image segment 172 to a second position corresponding to the sequentially next logical image segment 174 scanning speed may be enhanced.

With returning reference to FIG. 6, once the predicted focus value for the sequentially next logical image segment is determined, the objective 12 may be positioned at a sample distance corresponding to the determined predicted focus value prior to repositioning the sample from the first position corresponding to the current logical image segment 136 to the second position corresponding to the sequentially next logical image segment 138. A primary image corresponding to the sequentially next logical segment 138 may be acquired with the objective 12 positioned at a sample distance corresponding to the predicted focus value relative to the second logical image segment 138.

In accordance with further exemplary aspects of the present technique, if a current logical image segment includes a substantial amount of white space, then a predicted focus value for a sequentially next logical image segment may be determined based upon a measured focus value corresponding to an adjacent logical image segment from a previous row. Furthermore, if the measured focus value corresponding to the adjacent logical image segment from a previous row is not available, then a measured focus value corresponding to a nearby logical image segment from the previous row or column may be employed to determine a predicted focus value corresponding to the sequentially next logical image segment. In the present example of FIG. 6, several such white spaces may be scanned before the field of view is positioned at the third logical image segment 140. This method of autofocusing may be better understood with reference to FIG. 8.

Referring now to FIG. 8, a diagrammatic illustration 180 of a method of autofocusing is presented. More particularly, if a measured focus value for a current logical image segment (row r, column c) 182 is available, then a predicted focus value for a sequentially next logical image segment (row r, column c+1) 184 may be determined based upon the measured focus valued corresponding to the current logical image segment 182. However, if the measured focus valued corresponding to the current logical image segment 182 is not available, or if the current logical image segment 182 includes a large amount of white space, then a predicted focus value for the sequentially next logical image segment 184 may be determined based upon a measured focus value corresponding to an adjacent logical image segment (row r−1, column c+1) 186 from a previous row (r−1). Moreover, if even the measured focus valued corresponding to the adjacent logical image segment 186 is not available, then the predicted focus value for a sequentially next logical image segment 184 may be determined based upon a measured focus value corresponding to a neighboring but not necessarily adjacent logical image segment (row r−1, column c+2) 188 from a previous row (r−1). In addition, as previously noted, stored focus parameters corresponding to the respective logical image segments may be retrieved from the data repository 36 to facilitate determination of the predicted focus values. Reference numeral 190 is representative of a scan direction.

With returning reference to FIG. 6, in the present example, several white space segments are scanned before the field of view returns to the third logical image segment 140. A predicted focus value for the third logical image segment 140 may be determined based upon the measured focus value $z_1$ corresponding to the second logical image segment 138, as described with reference to FIG. 8. Additionally, the predicted focus value may also be determined based upon predictable focus variation information such as stored focus variation parameters corresponding to a location of the third logical image segment 140. In one embodiment, the predictable focus variation may be characterized as a function of (x, y) values corresponding to a logical image segment. As previously noted, the predictable focus variation may be calibrated manually or by automatically analyzing data from multiple previous scans. Accordingly, in one embodiment, the predictable focus variation (PFV) may be characterized as:

$$PFV = [ax + by] \quad (1)$$

where a is the slope of the scanning stage 22 in the x direction, b is the slope of the scanning stage 22 in the y direction, and (x, y) are position values representative of the second logical segment 138 or the third logical segment 140.

Accordingly, an optimal predicted focus value $z_{pred}$ for the third logical image segment 140 may be determined using the nearest measured focus value (measured focus value $z_1$ corresponding to the second logical image segment 138) and the stored focus variation parameter as:

$$z_{pred} = z_1 + [a(x_2 - x_1) + b(y_2 - y_1)] \quad (2)$$

In one embodiment, the computation of the predictable focus variation (PFV) (equation (1)) and measured focus values (equation (2)) may include linear functions. However, in certain other embodiments, non-linear functions may be used for the computation of the predictable focus variation and the measured focus values.

Similarly, a predicted focus value for the fourth logical image segment 142 may be predicted using the nearest measured focus $z_3$, while a predicted focus value for the fifth logical image segment 144 may be determined based on the nearest measured focus value $z_4$. Accordingly, nearby measured focus information for the current logical image segment may be combined with stored calibration information about the scanning stage 22, the slide 28, and/or other reproducible variation to extrapolate the predicted focus value for an upcoming logical image segment to be scanned.

Figure 9:
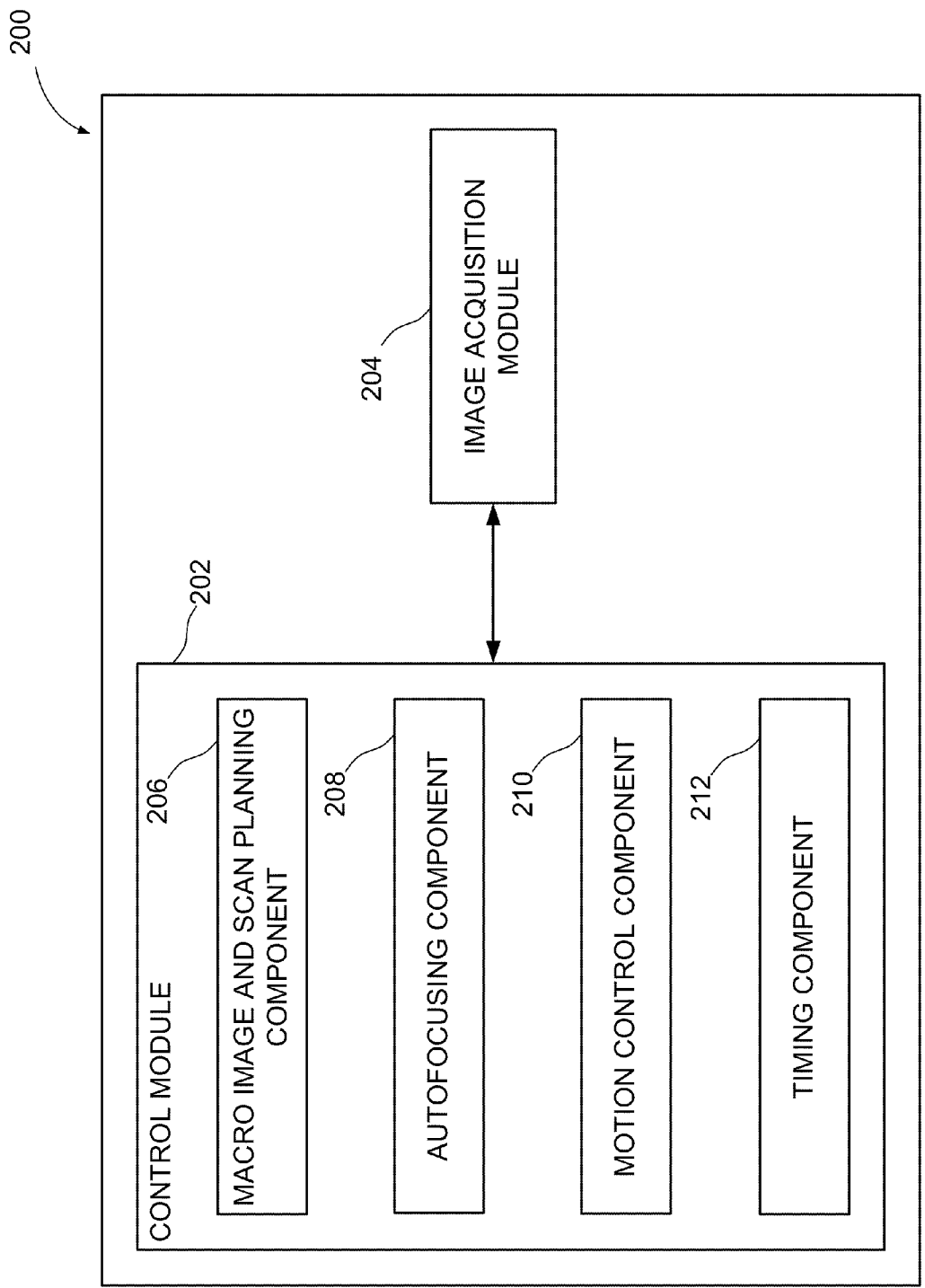
FIG. 9 is a block diagram illustrating one embodiment of a controller for use in the imaging device of FIG. 1, in accordance with aspects of the present technique.

Referring now to FIG. 9, one embodiment 200 of the controller 20 of FIG. 1 is illustrated. As previously noted, the controller 20 may be configured to determine a measured focus value corresponding to a first of a plurality of logical image segments, image the first logical image segment using the measured focus value, determine a predicted focus value for a second of the plurality of logical image segments using the measured focus value and a stored focus variation parameter, and image the second logical image segment using the predicted focus value. In a presently contemplated configuration, the controller 20 may include a control module 202 and an image acquisition module 204.

The control module 202 may be configured to control the scanning of the sample 24 disposed on the slide 28 and supported by the scanning stage 22 of the imaging device 10. In the illustrated embodiment, the control module 202 is shown as including a macro image and scan planning component 206, an autofocusing component 208, a motion control component 210 and a timing component 212. The macro image and scan planning component 206 may be configured to facilitate acquisition of the macro image and generation of a scan plan for the sample 24. Additionally, the macro image and scan planning component 206 may also be configured to enable communication with user interfaces and controls of the imaging device 10.

The autofocusing component 208 may be configured to control the scanning sequence planned by the scan planning component 206. In addition, the autofocusing component 208 may be configured to aid in the acquisition and processing of the auxiliary images acquired by the auxiliary image sensor 18. Moreover, the autofocusing component 208 may also be configured to aid in the calculation of the quantitative characteristics associated with the auxiliary images. Also, the autofocusing component 208 may be configured to facilitate storage of measured focus values and predicted focus values in the data repository 36 and the retrieval of stored focus variation parameters from the data repository 36. In addition, the autofocusing component 208 may be configured to facilitate storage of the auxiliary images acquired by the imaging device 10 in the data repository 36.

With continuing reference to FIG. 9, the motion control component 210 may be configured to facilitate loading and/or unloading of one or more slides from the scanning stage 22 of the imaging device 10. In addition, the motion control component 210 may also be used to aid in the computation of a coarse focus value prior to initiating the scanning sequence. Also, the motion control component 210 may be utilized to facilitate scanning motion control in the X-Y direction.

Furthermore, the timing component 212 may be configured to synchronize operation of the various components in the imaging device 10. More particularly, the timing component 212 may be configured to generate timing signals to control and synchronize the acquisition of auxiliary images and primary images. In certain embodiments, the timing component 212 may also control movement of the position controller.

Moreover, the image acquisition module 204 may be configured to facilitate acquisition of the primary images by the primary image sensor 16 of the imaging device 10. Additionally, the image acquisition module 204 may also be employed to post-process the acquired primary images. For example, the image acquisition module 204 may be used to facilitate registration of the acquired primary images. The acquisition module 204 may also be configured to aid in the generation of a plan for stitching the primary images for visualization of the images.

As will be appreciated by those of ordinary skill in the art, the foregoing example, demonstrations, and process steps such as those that may be performed by the controller 20 may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code, as will be appreciated by those of ordinary skill in the art, may be stored or adapted for storage on one or more tangible, machine readable media, such as on memory chips, local or remote hard disks, optical disks (that is, CD's or DVD's), or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

Figure 10:
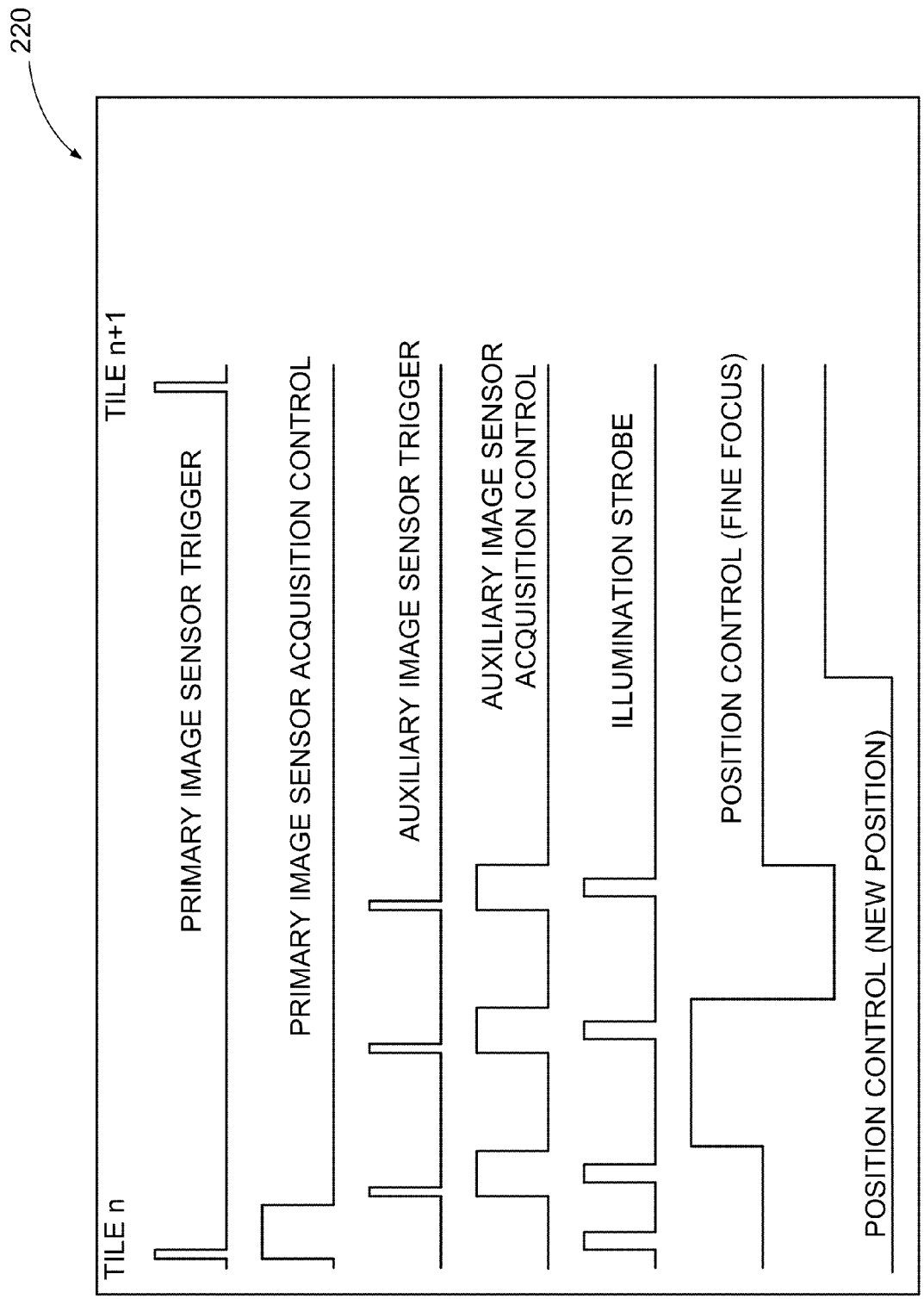
FIG. 10 is a timing diagram illustrating operational aspects of the imaging device of FIG. 1 in accordance with aspects of the present technique.

Referring now to FIG. 10, an example timing diagram 220 for performing autofocusing in accordance with exemplary aspects of the present technique is illustrated. In one embodiment, the signal timing of the various components in the imaging device 10 may be controlled and synchronized by the timing component 212 of FIG. 9. Although FIG. 10 and the following description refer to specific time increments, such timing is intended to be for illustrative purposes only. It may be appreciated that the speed at which imaging device 10 and its components operate may scale with technology and therefore any specific details should not be interpreted as limiting.

At a current logical image segment (tile n), the timing component 212 may trigger the primary image sensor 16 (see FIG. 1). Subsequently, an acquisition control for the primary image sensor 16 may be opened. In one embodiment, the acquisition control for the primary image sensor 16 may include a shutter of the primary image sensor 16. Also, in one embodiment, the shutter of the primary image sensor 16 may remain open for about 1 millisecond. The auxiliary image sensor 18 (see FIG. 1) may then be triggered to facilitate acquisition of the auxiliary images. As previously noted, the auxiliary image sensor 18 may be configured to acquire three auxiliary images at different focus values to aid in determining a measured focus value corresponding to the current logical image segment. Accordingly, the auxiliary image sensor 18 may be triggered at three different times. At each trigger, an acquisition control for the auxiliary image sensor 18 may be opened to acquire a corresponding auxiliary image. In one embodiment, the acquisition control for the auxiliary image sensor 18 may include a shutter of the auxiliary image sensor 18. Moreover, in one embodiment, the auxiliary image sensor 18 may be triggered at time intervals of about 10 milliseconds between each trigger. Furthermore, when the shutter of the auxiliary image sensor 18 is open, an illumination strobe may also be triggered to activate a LED or other illumination devices. In one embodiment, the duration of each trigger to the illumination strobe may be about 10 milliseconds. The illumination device may be configured to illuminate the sample 24, thereby aiding in the acquisition of the three auxiliary images.

Moreover, the position controller may be configured to move the objective 12 relative to the sample 24 in the Z-direction based upon information received from the auxiliary image sensor 18. More particularly, position controller may be configured to position the objective 12 at a first focus value to acquire the first auxiliary image. As previously noted, the first focus value may include a coarse focus value, in certain embodiments. Subsequently, as depicted in FIG. 10, the position controller may be configured to position the objective 12 at a second focus value, where the second focus value is less than the first focus value to facilitate acquisition of the second auxiliary image. Similarly, the position controller may be configured to subsequently position the objective 12 at a third focus value, where the third focus value is greater than the first focus value to facilitate acquisition of the third auxiliary image. Once the measured focus value is determined, the position controller may be configured to position the objective 12 at a sample distance corresponding to the measured focus value. It may be noted that the position controller may be configured to position the objective 12 at a sample distance corresponding to the measured focus value prior to arrival of the next logical image segment (tile n+1) relative to the objective 12. As illustrated in FIG. 10, in one embodiment, the process of autofocusing the sample between the current logical image segment (tile n) and the next logical image segment (tile n+1) may be completed in a time interval in a range from about 60 milliseconds to about 80 milliseconds.

The method for autofocusing and the imaging device described hereinabove dramatically enhance the scanning speed with minimal decrease in image quality. More particularly, since an optimal focus value for an upcoming logical image segment is determined and any adjustments to the focus value are implemented while the sample is repositioned from a first position corresponding to a current logical image segment to a second position corresponding to an upcoming logical image segment, scanning speed may be enhanced. Additionally, the predicted focus values for logical image segments to be acquired in the future use information from previously acquired logical image segments and any predictable sources of variation such as stage tilt and wobble, thereby resulting in enhanced predicted optimal focused values. Accurate prediction of focus value for an upcoming image segment circumvents the need to complete an autofocus process at the logical image segment before acquiring the main image and thereby significantly increases scan speed while maintaining adequate focus quality. By incorporating repeatable mechanical stage height variation into the autofocus prediction algorithm, the requirements for stage precision are eased, potentially leading to lower cost. Image quality and scanner throughput may be enhanced, thereby improving clinical workflow by enhancing scanning speed while maintaining image quality.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. In an imaging device having an objective and a stage for holding a sample to be imaged, a method for autofocusing, comprising:
   determining a measured focus value corresponding to at least a first of a plurality of logical image segments;
   imaging the first logical image segment using the measured focus value;
   determining a predicted focus value for a second of the plurality of logical image segments using the measured focus value and a stored focus variation parameter; and
   imaging the second logical image segment using the predicted focus value.

2. The method of claim 1, further comprising:
   determining a coarse focus location for imaging the sample supported by a scanning stage;
   positioning the objective at the determined coarse focus location; and
   determining a coarse focus value for imaging the sample supported by the scanning stage.

3. The method of claim 1, further comprising logically segmenting the sample into the plurality of logical image segments.

4. The method of claim 1, wherein the measured focus value is determined while the sample is repositioned relative to the imaging device.

5. The method of claim 1, wherein the predicted focus value is determined while the sample is repositioned from a first position corresponding to the first logical image segment to a second position corresponding to the second logical image segment.

6. The method of claim 1, wherein imaging the second logical image segment using the predicted focus value comprises increasing or decreasing a distance separating the sample and the objective.

7. The method of claim 1, wherein the stored focus variation parameter represents a reproducible variation in the imaging device, the sample, or both the imaging device and the sample.

8. The method of claim 7, wherein the stored focus variation parameter represents a tilt or wobble associated with the stage.

9. The method of claim 7, wherein the stored focus variation parameter represents a reproducible variation with a slide containing the sample.

10. The method of claim 1, wherein determining the predicted focus value comprises retrieving one or more stored focus variation parameters from a data repository.

11. The method of claim 1, wherein determining the measured focus value corresponding to at least the first of the plurality of logical image segments comprises:
   acquiring at least three auxiliary images at different focus values;
   determining a quantitative characteristic for each of the auxiliary images; and
   interpolating the measured focus value from the quantitative characteristics.

12. The method of claim 11, wherein determining the measured focus value further comprises offsetting a region of interest in the at least three auxiliary images by a determined amount to facilitate selection of a substantially similar set of image pixels in each of the at least three auxiliary images.

13. The method of claim 12, wherein determining a quantitative characteristic comprises determining, for each pixel in subset of pixels, a difference in intensities between the pixel and a neighboring pixel laterally separated from the pixel by at least one other pixel, and summing the squared difference in intensities for each pixel across the height and width of the image.

14. The method of claim 12, wherein interpolating the measured focus value from the quantitative characteristics comprises:
   interpolating the measured focus value by fitting the quantitative characteristics of the at least three auxiliary images to a unimodal function; and
   identifying a mode on the curve.

15. The method of claim 14, wherein determining the measured focus value further comprises determining the measured focus value based upon the identified mode, the stored focus variation parameter, or a combination thereof.

16. An imaging device, comprising:
   an objective lens;
   a primary image sensor configured to generate a primary image of a sample at a primary frame rate;
   an auxiliary image sensor configured to generate one or more auxiliary images of the sample at an auxiliary frame rate that is faster than the primary frame rate;
   a controller configured to adjust a focus value between the objective lens and the sample along an optical axis to autofocus the image of the sample;
   a scanning stage to support the sample and move the sample in at least a lateral direction that is substantially orthogonal to the optical axis,
   wherein the controller is configured to:
      determine a measured focus value corresponding to at least a first of a plurality of logical image segments;
      image the first logical image segment using the measured focus value;
      determine a predicted focus value for a second of the plurality of logical image segments using the measured focus value and a stored focus variation parameter; and
      image the second logical image segment using the predicted focus value.

17. The imaging device of claim 16, further comprising a beam splitter configured to split light that is collected from the sample and passes through the objective lens into a primary light path and an auxiliary light path.

18. The imaging device of claim 16, wherein the imaging device comprises a digital optical microscope.

19. An imaging device, comprising:
   an objective lens;
   a primary image sensor configured to generate a primary image of a sample at a primary frame rate;
   an auxiliary image sensor configured to generate one or more auxiliary images of the sample at an auxiliary frame rate that is faster than the primary frame rate;
   a controller configured to adjust a focus value between the objective lens and the sample along an optical axis to autofocus the image of the sample;
   a scanning stage to support the sample and move the sample in at least a lateral direction that is substantially orthogonal to the optical axis,
   wherein the controller comprises:
      a macro image and scan planning component to determine a scan plan of the sample;
      an autofocusing component to acquire and process auxiliary images;
      a motion control component to control motion of the sample relative to the objective; and
      a timing component to synchronize timing for acquisition of the auxiliary images, the primary images, or both.

20. The imaging device of claim 19, further comprising an image acquisition module for acquisition of one or more primary images.

21. The imaging device of claim 19, wherein the imaging device comprises a digital optical microscope.

* * * * *